United States Patent
Takahashi

(10) Patent No.: US 7,423,675 B2
(45) Date of Patent: Sep. 9, 2008

(54) ELECTRONIC CAMERA AND DATA FILE GENERATING APPARATUS

(75) Inventor: Isao Takahashi, Koshigaya (JP)

(73) Assignee: Nikon Corporation, Tokyo (JP)

( * ) Notice: Subject to any disclaimer, the term of this patent is extended or adjusted under 35 U.S.C. 154(b) by 695 days.

(21) Appl. No.: 10/469,779

(22) PCT Filed: Mar. 6, 2002

(86) PCT No.: PCT/JP02/02083

§ 371 (c)(1),
(2), (4) Date: Oct. 8, 2003

(87) PCT Pub. No.: WO02/071748

PCT Pub. Date: Sep. 12, 2002

(65) Prior Publication Data

US 2004/0075751 A1     Apr. 22, 2004

(30) Foreign Application Priority Data

Mar. 6, 2001   (JP) ............................. 2001-062129

(51) Int. Cl.
*H04N 5/76* (2006.01)
(52) U.S. Cl. .................................. 348/231.99
(58) Field of Classification Search .. 348/231.99–231.9
See application file for complete search history.

(56) References Cited

U.S. PATENT DOCUMENTS

| | | | | |
|---|---|---|---|---|
| 5,325,189 A | * | 6/1994 | Mimura | 348/231.6 |
| 6,201,571 B1 | * | 3/2001 | Ota | 348/239 |
| 6,977,683 B1 | | 12/2005 | Okada | |

FOREIGN PATENT DOCUMENTS

| | | |
|---|---|---|
| EP | 0 822 724 A2 | 2/1998 |
| JP | A-6-98153 | 4/1994 |
| JP | A-8-70469 | 3/1996 |
| JP | A 10-023371 | 1/1998 |
| JP | A-11-168745 | 6/1999 |
| JP | A-2000-13659 | 1/2000 |
| JP | A-2000-115693 | 4/2000 |
| JP | A-2001-61141 | 3/2001 |

* cited by examiner

*Primary Examiner*—James M. Hannett
(74) *Attorney, Agent, or Firm*—Oliff & Berridge, PLC

(57) ABSTRACT

Image data outputted from an image-capturing device 14 is divided to generate a plurality of image data files that are separately reproducible. Using divisional image data included in each of the plurality of image data files, the image data before division is restored. When a color image is to be divided on a pixel-by-pixel basis, data for red, data for green and data for blue are respectively included in the image data of each pixel. When a color image is to be divided on an RGB basis, an image data file for red, a image data file for green and a image data file for blue are created.

26 Claims, 9 Drawing Sheets

FIG.7
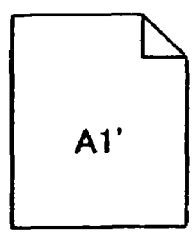
| 11 | 12 | 13 | 41 | 42 | 43 | ... |
| X1 | X2 | X3 |
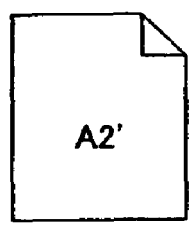
| 21 | 22 | 23 | 51 | 52 | 53 | ... |
| Y1 | Y2 | Y3 |
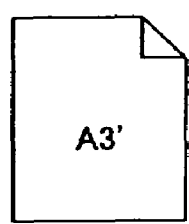
| 31 | 32 | 33 | 61 | 62 | 63 | ... |
| Z1 | Z2 | Z3 |

ELECTRONIC CAMERA AND DATA FILE GENERATING APPARATUS

The disclosure of the following priority application is herein incorporated by reference:
Japanese Patent Application No. 2001-62129.

TECHNICAL FIELD

The present invention relates to an electronic camera that records a photographed image as electronic data and to a data file generating apparatus that generates a data file in the form of, e.g., an image, voice or text.

BACKGROUND ART

Data of images photographed with an electronic camera or the like are protected by the rights, such as a portrait right of a photographed subject and a copyright of a photographer. The inventor has found a way of dividing image data into plural image data and allowing the divided image data to be handled separately, and also splitting the aforementioned portrait right and copyright by disposing information enough to know the original image data in the divided incomplete image data.

DISCLOSURE OF THE INVENTION

The present invention is to provide an electronic camera and a data file generating apparatus that divide image or other data to split the portrait right or copyright.

An electronic camera according to the present invention comprises: an image-capturing device that captures an subject image and outputs image data obtained; a dividing means for dividing the image data outputted from the image-capturing device; and a file generating means for generating separately reproducible a plurality of image data files containing divisional image data divided by the dividing means.

The image data before division is restored using the divisional image data included in each of the plurality of image data files.

The data structure of each of the plurality of image data files can as follows:

Each of the plurality of image data files includes an image data region in which the divisional image data are recorded and a complementary data region in which complementary data other than the divisional image data is recorded, and the image data region is set at a region equivalent to a recording region in which the divisional image data to be recorded in this image data region are recorded in the image data before division.

As alternative, the following data structure may be employed. That is, each of the plurality of image data files includes an image data region in which the divisional image data are recorded and a complementary data region in which complementary data other than the divisional image data is recorded, and within each image date file, a plurality of divisional image data are continuously recorded.

The timing to generate the image data files may be as follows.

The electronic camera further comprises an image processing means for conducting predetermined data processing on the image data outputted from the image-capturing device. The file generating means generates the plurality of image data files after the image processing means conducts the data processing at the time of photographing of the camera.

The electronic camera often comprises an outputting means for outputting the image data outputted from the image-capturing device to an external device. In this electronic camera, the file generating means generates the plurality of image data files before the image data is outputted from the outputting means. For example, in response to a request to output the image data from the outputting means to the external device, the dividing means divides the image data and the file generating means generates the plurality of image data files.

The dividing means may divide the image data outputted from the image-capturing device on a pixel-by-pixel basis.

In this electronic camera, the image data of the pixels can be composed of image data for red, image data for green, and image data for blue.

The dividing means may divide the image data outputted from the image-capturing device into data for red, data for green, and data for blue. In this electronic camera, the file generating means can generate separately reproducible an image data file for red, an image data file for green, and an image data file for blue that respectively contains image data for red, image data for green, and image data for blue divided by the dividing means.

The dividing means may divides the image data outputted from the image-capturing device into a plurality of predetermined blocks. In this electronic camera, a file generating means can generates separately reproducible a plurality of image data files containing the image data of the plurality of blocks divided by the dividing means.

For an electronic camera that divides the image data outputted from the image-capturing device by a predetermined algorithm and generates image data files, it is necessary to record the algorithm. In this case, the algorithm may be recorded in each data file, or a single algorithm file having the algorithm recorded thereon may be generated.

Since the image data includes an image information portion and an additional information portion, it can be arranged that the image data files respectively include image information portions and additional information portions having been divided. Alternatively, the dividing means divides only image data of the image information portion so that a plurality of image information files including the image information portions divided and an additional information file including the additional information portion undivided are generated.

It is generally preferred that image data that the dividing means divides be image data serving as one image when it is restored.

The above data division and data file generation can be effected on not only image data but also on data such as voice data or text data bringing about various rights such as copyrights and portrait rights.

The above image file division may be conducted on a personal computer.

The electronic camera may be configured as follows.

This electronic camera comprises: a monitor that displays an original image before division; a selection operation member that selects a plurality of predetermined templates of arbitrary shapes; a display control device that superimposes a selected template on the original image displayed on the monitor; and a file generating means for generating, from the image data, a first divisional image file by reading image data within a region corresponding to the template and complementing image data of a remaining region by image data that is different from the original image, and for generating, from the original image data, a second divisional image file by reading image data of a region other than the region corresponding to the template and complementing image data of a remaining region by image data that is different from the original image data.

BRIEF DESCRIPTION OF DRAWINGS

FIG. 7 is an explanatory diagram of pixel thinning division that does not use complementary data.

BEST MODE FOR CARRYING OUT THE INVENTION

Embodiments of the present invention will now be described with reference to the drawings.

First Embodiment

Figure 1:
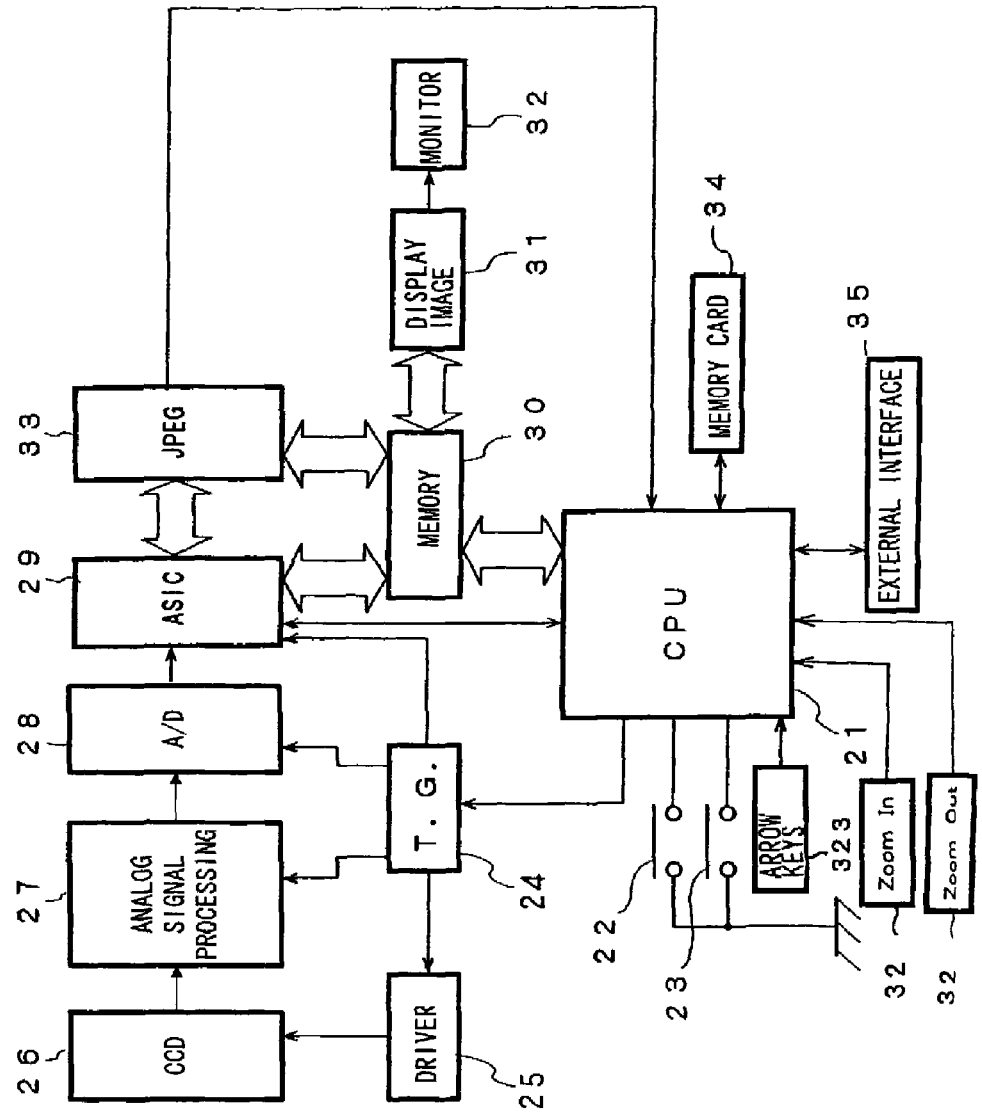
FIG. 1 is a block diagram showing the outline of an electronic still camera according to an embodiment of the invention.

FIG. 1 is a block diagram showing the outline of an electronic still camera according to a first embodiment of the invention. In FIG. 1, a half-pressed signal and a full-pressed signal are respectively inputted to a CPU 21 from a half-pressed switch 22 and a full-pressed switch 23 that work together with a shutter release button not shown. When the half-pressed signal is inputted to the CPU 21, the CPU 21 drives a timing generator 24 and a driver 25 to control operation of a CCD 26, which is an image-capturing device. The operational timing of an analog processing circuit 27 and an A/D conversion circuit 28 is controlled by the timing generator 24.

When the full-pressed switch 23 is turned ON after the half-pressed switch 22 is turned ON as described above, light from a subject is imaged on a light-receiving surface of the CCD 26 through a photographic lens not shown. The CCD 26 stores a signal charge in accordance with the brightness of the subject image. The signal charge stored in the CCD 26 is swept out by a drive signal from the driver 25 and inputted to the analog signal processing circuit 27 including, e.g., an AGC circuit and a CDS circuit. After analog processing such as gain control and noise removal has been performed on an inputted analog image signal by the analog signal processing circuit 27, the analog image signal is converted to a digital signal by the A/D conversion circuit 28. The digital-converted image signal is introduced to an image processing CPU 29 configured as, e.g., an ASIC, where image processing such as white balance adjustment, edge enhancement and gamma correction is conducted.

Formatting (image post-processing) for JPEG compression is further performed on the image data on which image preprocessing has been conducted, and the formatted image data is temporarily stored in a buffer memory 30. The image data stored in the buffer memory 30 is processed into image data for display by a display image creating circuit 31 and displayed as a photograph result on an LCD monitor 32. The image data stored in the buffer memory 30 is also data-compressed to a predetermined ratio in JPEG format by a compression circuit 33 and recorded in a recording medium 34 such as a Flash Memory Card.

An external interface circuit 35 is, for example, an IEEE1394 interface, a LAN interface, a USB interface or a Bluetooth interface, and sends and receives data such as image data between the electronic still camera and external devices. Arrow keys 323 are used when moving a division template described later up, down, left and right on the monitor 32. A Zoom In button 324 and a Zoom Out button 325 are used when magnifying and reducing the template on the monitor 32.

In the electronic still camera described above, the image data stored in the buffer memory 30 is divided into a plurality of image data from one image data in accordance with a divisional rule described later. A plurality of image data thus divided are handled as follows.

(1) The image data are processed into image data for display by the display image creating circuit 31 and displayed on the LCD monitor 32.

(2) The image data are data-compressed to a predetermined ratio in JPEG format by the compression circuit 33 and recorded in the recording medium 34.

(3) The image data are recorded in the recording medium 34 without being data-compressed.

(4) The image data are sent to an external device via the external interface circuit 35.

That is, normally, it is preferable for the image data to be divided to be image data that becomes one image when it is restored.

The present invention is arranged so that one image data is divided into a plurality of image data to be handled separately. The first embodiment is characterized in that image data is divided into a plurality of image data by pixel thinning. Generating a plurality of files of the divided image data is conducted at a timing of any of: (a) before the photographic result is displayed on the LCD monitor 32 after processing at the time of camera shooting, (b) before the photographed image data is recorded in the recording medium 34, and (c) during the time from after photographing to until when the photographed image data is sent to an external device via the external interface circuit 35. The timing at which such divisional image data files are generated is changed and set in advance by menu setting of the electronic still camera.

The divisional processing is appropriately executed by the CPU 21 and the ASIC 29, and the plurality of divisional files after division are recorded in the memory card 34 together with an original image file. The invention may be configured so that only the divisional files are recorded in the memory card, and the original image does not have to be recorded. Alternatively, in an electronic camera where a recording medium is disposed separately from the memory card 34, the divisional files may be recorded in the memory card 34 and the original image file may be recorded in the recording medium separate from the memory card 34. In this case, the recording medium may be a card-type recording medium similar to the memory card 34 and two memory card slots may be disposed in the electronic camera.

The electronic camera of the first embodiment can divide an original image with various divisional methods as described later. Thus, a program for executing divisional processing according to those methods is stored in advance.

Figure 2:
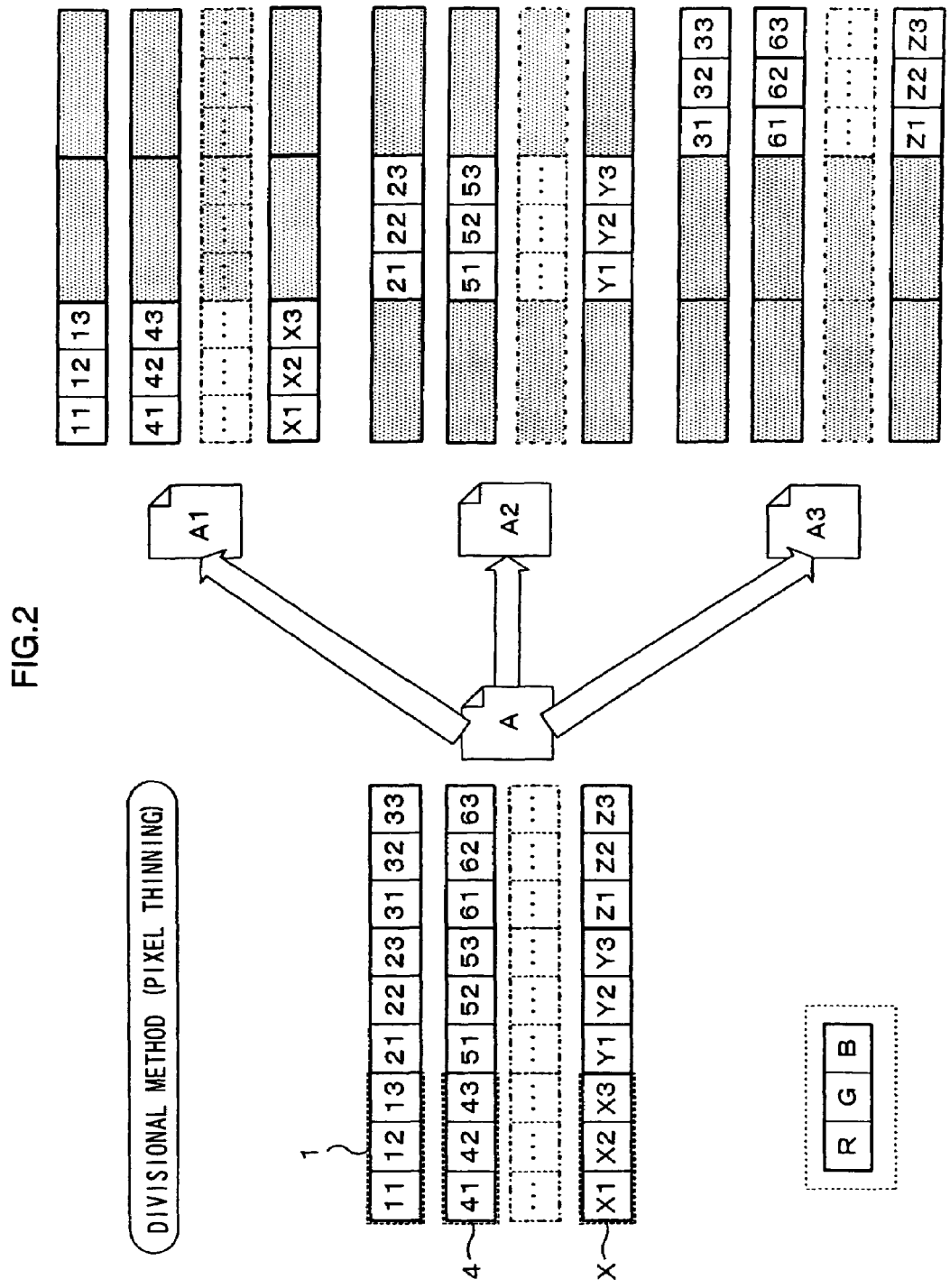
FIG. 2 is an explanatory diagram of pixel thinning division for dividing an original image data file into three image data files.

FIG. 2 is an explanatory diagram of pixel thinning division where one original image data file A is divided into three image data files A1, A2 and A3. In the original image data file A of FIG. 2, a first pixel 1 is composed of data 11, data 12 and data 13. For example, when the three pieces of data composing up the one pixel are respectively R data, G data and B data of the three primary colors, the data 11 is R data, the data 12 is G data, and the data 13 is B data. Similarly, a second pixel is composed of data 21, data 22 and data 23. Also, a third pixel is composed of data 23, data 32 and data 33. Moreover, an Xth pixel X is composed of data X1, data X2 and data X3.

In the first image data file A1 after division, the first pixel is composed of the data 11, the data 12 and the data 13. The second pixel and the third pixel are respectively composed of three complementary data of RGB. Here, the complementary data are, for example, data that reproduce black. In this case, the complemented image becomes black. A fourth pixel of the first image data file A1 is composed of data 41, data 42 and data 43. A fifth pixel and a sixth pixel are respectively composed of three complementary data. In this manner, in the first image data file A1 of the divided image data files of N number, data of a (1+Nx)th pixel of the original image data file A is substituted as data of the (1+Nx)th pixel. Here, N is the divisional number and x is 0, 1, 2, etc. That is, the image data file A1 includes data 1 of the first pixel, data 4 of the fourth pixel, data 7 of the seventh pixel, and so on.

In the second image data file A2 after division, the first pixel and the third pixel are respectively composed of three complementary data. The second pixel is composed of the data 21, the data 22 and the data 23. A fourth pixel and a sixth pixel of the second image data file A2 are respectively composed of three complementary data. A fifth pixel is composed of data 51, data 52 and data 53. In this manner, in the second image data file A2 of the divided image data files of N number, data of a (2+Nx)th pixel of the original image data file A is substituted as data of the (2+Nx)th pixel. Here, N is the divisional number and x is 0, 1, 2, etc. That is, the image data file A2 includes data 2 of the second pixel, data 5 of the fifth pixel, data 8 of the eighth pixel, and so on.

In the third image data file A3 after division, the first pixel and the second pixel are respectively composed of three complementary data. A third pixel is composed of the data 31, the data 32 and the data 33. A fourth pixel and a fifth pixel of the third image data file A3 are respectively composed of three complementary data. A sixth pixel is composed of data 61, data 62 and data 63. In this manner, in the third image data file A3 of the divided image data files of N number, data of a (3+Nx)th pixel of the original image data file A is substituted as data of the (3+Nx)th pixel. Here, N is the divisional number and x is 0, 1, 2, etc. That is, the image data file A3 includes data 3 of the third pixel, data 6 of the sixth pixel, data 8 of the eighth pixel, and so on.

According to the above-described pixel thinning division, when the three pieces of data making up the pixels of the original image data file A before division are R data, G data and B data of the three primary colors, the three image data files A1, A2 and A3 after division are achieved to include a color image.

The image data files A1, A2 and A3 after division are data files that respectively include 1/3 of the image data of the original data file A and in which 2/3 of the data are composed of complementary data. Thus, the image data files A1, A2 and A3 after division can be independently handled because their file format is the same as that of the original image data file A. For example, when the original data file A is a file in JPEG format, the image data files A1, A2 and A3 after division are also files in JPEG format. In this case, the image data files A1, A2 and A3 after division can be separately reproduced in a manner similar to when the original image data file A is reproduced.

Because each of the image data files A1, A2 and A3 after division only contains part of the information of the original image data file A, the original image cannot be completely reproduced. However, an image with which it is possible to know what kind of image data is contained in the original image data file A can be reproduced. That is, it is possible to know if the original image data file A contains a portrait image, a scenic image, or a text image. Of course, the original image data file A can be restored by reproducing all of the image data files A1, A2 and A3 after division, replacing the complementary data portions thereof with data that the other image data files have and synthesizing the image data. Such image restoration is conducted using an algorithm reverse to that of image division.

When the original image data file is equally divided into files of N number after division each of which contains 1/N of the information of the original image data, for example, a rate of completion U when these files are reproduced is expressed by the following equation (1).

$$U = M/N \times 100 [\%] \qquad (1)$$

Here, M is the number of files used at the time of reproduction and N is the divisional number.

As described above, in a case where the original image data file is divided into the three image data files A1, A2 and A3, N=3. In a case where any one image data file after division is reproduced, 1 is substituted for M so that the rate of completion U=33% is calculated. In a case where three image data files after division are used and synthesized, i.e., the original image data file is restored, 3 is substituted for M so that the rate of completion U=100% is calculated.

According to the above-described first embodiment, the following operation and advantages are obtained.

(1) The original image data file A is divided to obtain the three image data files A1, A2 and A3 of the same file format as that of the original image data file A. Images of the divided image data files A1, A2, and A3 can be separately reproduced, and each image allows a user to know what kind of image data is contained in the original image data file A. Because the divided image data files A1, A2 and A3 can be independently handled, the rights for viewing the image resulting from the original image data file A can be split into three.

(2) By reproducing all of the divided image data files A1, A2 and A3, replacing the complementary data portions of each image data file with data that the other image data files have and synthesizing the image data, an image of the original image data file before division can be restored. As a result, the rights such as the portrait right and the copyright of the image regarding the original image data file A, which were split into three can be returned to the state before division.

(3) Because the division of the original image data file A is conducted by pixel (respectively including RGB data) thinning division, when the three pieces of data composing each pixel of the original data image file A before division are respectively R data (data for red), G data (data for green) and B data (data for blue) of the three primary colors, the three divided image data files A1, A2 and A3 are achieved to include a color image.

Although data that reproduces black was used as the complementary data in the above description, data that reproduces white instead of black may also be used. Also, data that reproduces another color may be used.

Also, predetermined image data such as an advertisement or predetermined text data may also be used as the complementary data.

Moreover, unspecified numbers such as random numbers may also be used for the complementary data.

Image data resulting from division of another image data file may be used as the complementary data. The original image data file A is divided, as described above, into the three image data files A1, A2 and A3. Here, similar to the original image data file A, an original image data file B is divided into three image data files B1, B2 and B3. Moreover, similar to the original image data file A, an original image data file C is divided into three image data files C1, C2 and C3. The data of the image data files B2 and C3 are then used as the complementary data of the image data file A1. Also, the image data files B1 and C3 are used as the complementary data of the image data file A2. Similarly, the data of the image data files B1 and C2 are used as the complementary data of the image data file A3. In this manner, an increase in data size that arises due to the number of files increasing as a result of division can be suppressed and the amount of memory used can be conserved.

Second Embodiment

Figure 3:
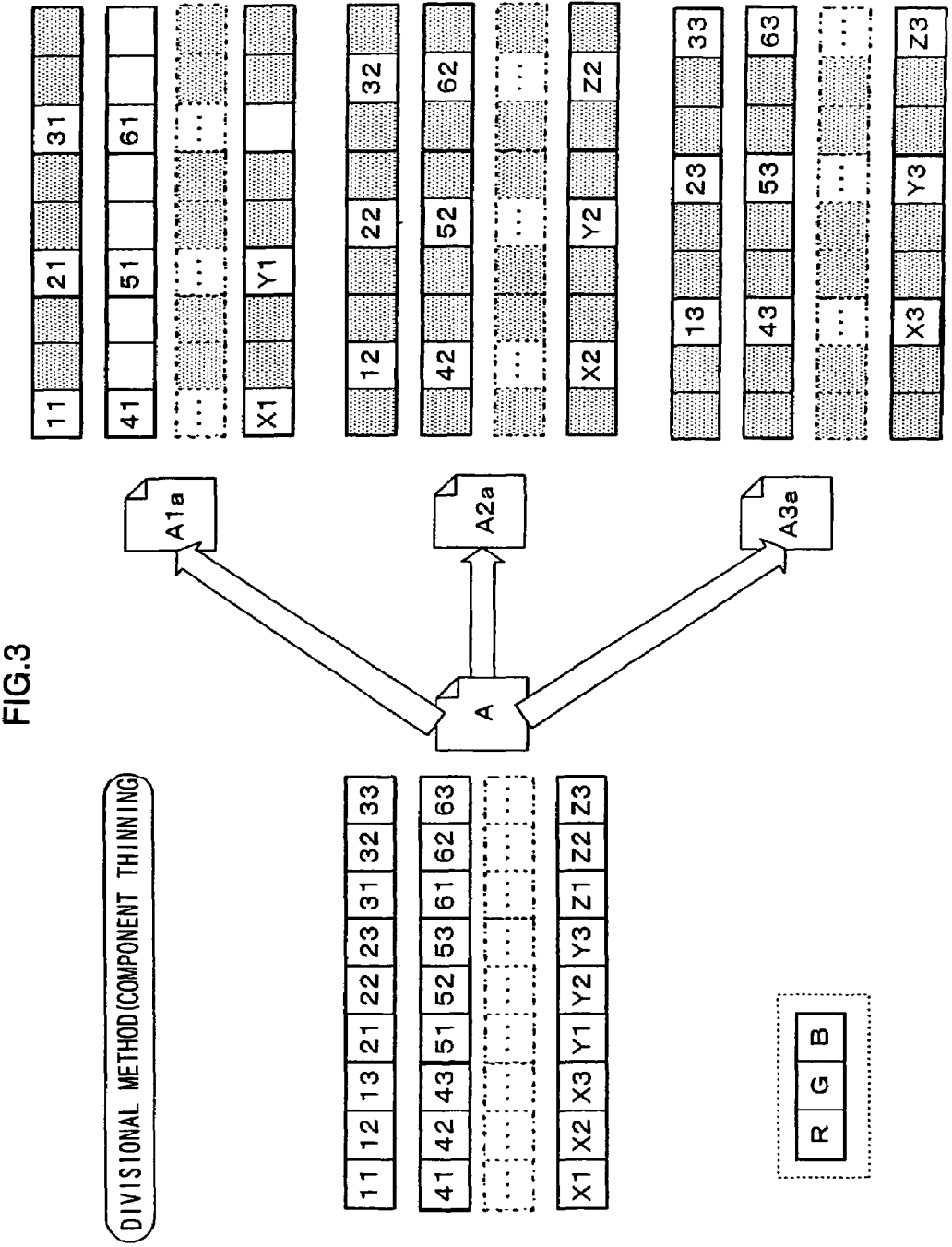
FIG. 3 is an explanatory diagram of component thinning division for dividing an original image data file into three image data files.

A second embodiment is characterized in that image data is divided into a plurality of image data by component thinning. FIG. 3 is an explanatory diagram of component thinning division where one original image data file A is divided into three image data files A1a, A2a and A3a. In FIG. 3, the data of the original image data file A has the same configuration as that of FIG. 2.

With respect to the first image data file A1a after division, the first of the three pieces of data making up the first pixel is composed of data 11, and the second and third are composed of complementary data. The complementary data are, for example, data that reproduce black. In the three pieces of data making up the second pixel, the first is data 21, and the second and third are composed of complementary data. In the three pieces of data making up the third pixel, the first is data 31, and the second and third are composed of complementary data. In this manner, in the first image data file A1a of the divided image data files of N number (in the example of FIG. 3, N=3), the first data of the data of N number configuring each pixel of the original image data file A is substituted as the first data of the data of N number configuring each pixel. In other words, in a case where the three pieces of data making up the pixels of the original image data file A are R data, G data and B data of the three primary colors, the first image data file A1a after division is composed of R data and complementary data.

With respect to the second image data file A2a after division, the first and third of the three pieces of data making up the first pixel are composed of complementary data, and the second is composed of data 12. In the three pieces of data making up the second pixel, the first and the third are composed of complementary data, and the second is composed of data 22. In the three pieces of data making up the third pixel, the first and the third are composed of complementary data, and the second is composed of data 32. In this manner, in the second image data file A2a of the divided image data files of N number, the second data of the data of N number configuring each pixel of the original image data file A is substituted as data of the second data of the data of N number configuring each pixel. In other words, in a case where the three pieces of data making up the pixels of the original image data file A are R data, G data and B data of the three primary colors, the second image data file A2a after division is composed of G data and complementary data.

With respect to the third image data file A3a after division, the first and second of the three pieces of data making up the first pixel are composed of complementary data, and the third is composed of data 13. In the three pieces of data making up the second pixel, the first and the second are composed of complementary data, and the third is composed of data 23. In the three pieces of data making up the third pixel, the first and the second are composed of complementary data, and the third is composed of data 33. In this manner, in the third image data file A3a of the divided image data files of N number, the third data of the data of N number configuring each pixel of the original image data file A is substituted as the third data of the data of N number configuring each pixel. In other words, in a case where the three pieces of data making up each pixel of the original image data file A are R data, G data and B data of the three primary colors, the third image data file A3a after division is composed of B data and complementary data.

According to the above-described component thinning division, when the three pieces of data making up the pixels of the original image data file A before division are respectively R data, G data and B data of the three primary colors, the three image data files A1a, A2a and A3a after division are achieved so that they respectively become an R image, a G image and a B image.

According to the above-described second embodiment, similar to the first embodiment, the rights for viewing the image resulting from the original image data file A can be split. Moreover, because division of the original image data file A is conducted by component thinning division, when the three pieces of data making up the pixels of the original image data file A are R data, G data and B data of the three primary colors, the three image data files A1a, A2a and A3a after division are obtained, which contain images of the respective color components.

In the above description, a case was described where the three pieces of data making up the pixels of the image data file A before division were respectively R data, G data and B data from RGB space. Instead of this, four pieces of data making up the pixels of the original image data file A maybe data of cyan, magenta, yellow and black from CMYB spaces. In this case, when the original image data file A is divided into four image data files A1a, A2a, A3a and A4a, the four image data files A1a, A2a, A3a and A4a after division respectively become images of the respective color components. That is, it is a case where N=4.

The three pieces of data making up the pixels of the original image data file A may also be data from Lab color space. In this case, when the original image data file A is divided into three image data files A1a, A2a and A3a, the three image data files A1a, A2a and A3a after division respectively contain images of the respective color components.

Third Embodiment

Figure 4:
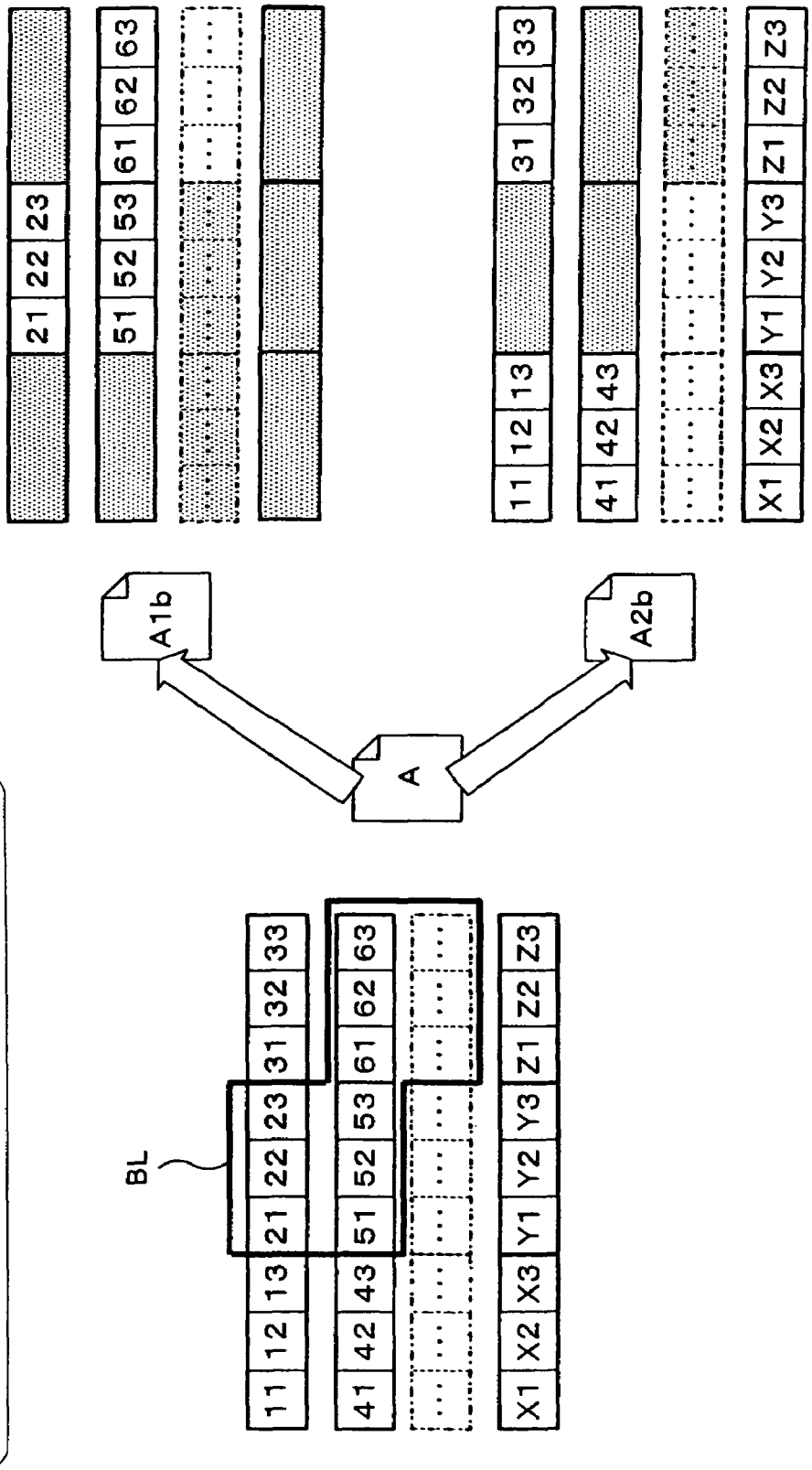
FIG. 4 is an explanatory diagram of arbitrary region thinning division for dividing an original image data file into two image data files.

A third embodiment is characterized in that image data is divided into a plurality of image data by arbitrary region thinning. FIG. 4 is an explanatory diagram of arbitrary region thinning division where one original image data file A is divided into two data image files A1b and A2b. In FIG. 4, the data of the original image data file A has the same configuration as that of FIG. 2.

The first image data file A1b after the division into two image data files includes a region, data of which coincides with data of an arbitrary region within the data configuring the original image data file A, i.e., the data enclosed by the black line BL. Data of the other region is composed of complementary data. In this manner, only the data of the region allocated for the first image data file after division coincides with the data of the original image data file A.

In the second image data file A2b after the division into two image data files, data of an arbitrary region within the data configuring the original image data file A, i.e., the data enclosed by the black line, is composed of complementary data. Data of the other regions coincides with data of the original image data file A. In this manner, only the data of the region allocated for the second image data file after division coincides with the data of the original image data file A.

In other words, in a n-th image data file Anb (n=1 through N) after division into image data files of N number, only data of the region allocated for the n-th image data file after division coincides with the data of the original image data file.

According to the above-described third embodiment, similar to the first and second embodiments, the portrait rights and the copyrights of the image resulting from the original image data file A can be split.

Figure 8:
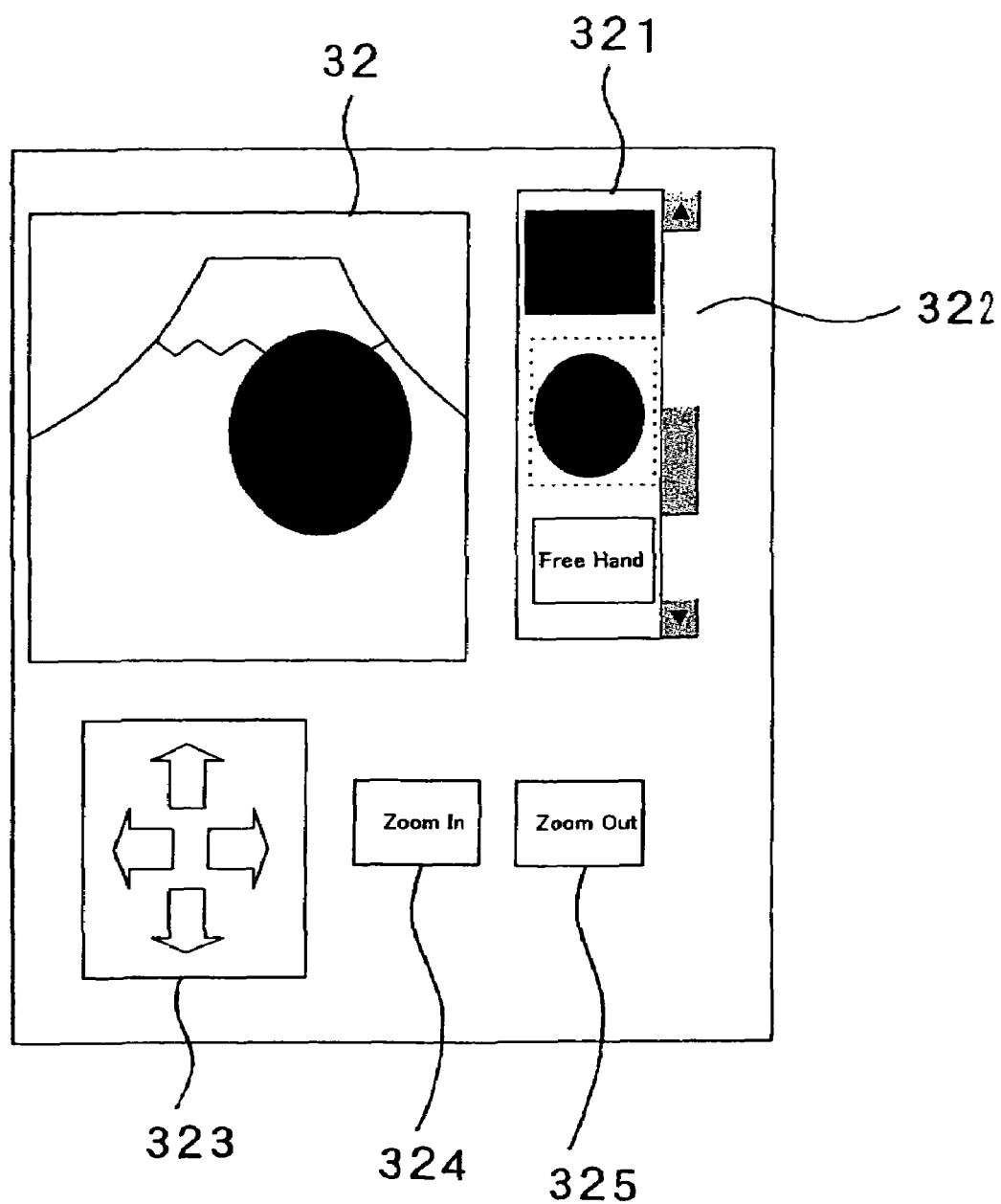
FIG. 8 is an explanatory diagram of an operating system that is used when image data recorded in a single image file is divided into a plurality of arbitrary shapes.
Figure 9:
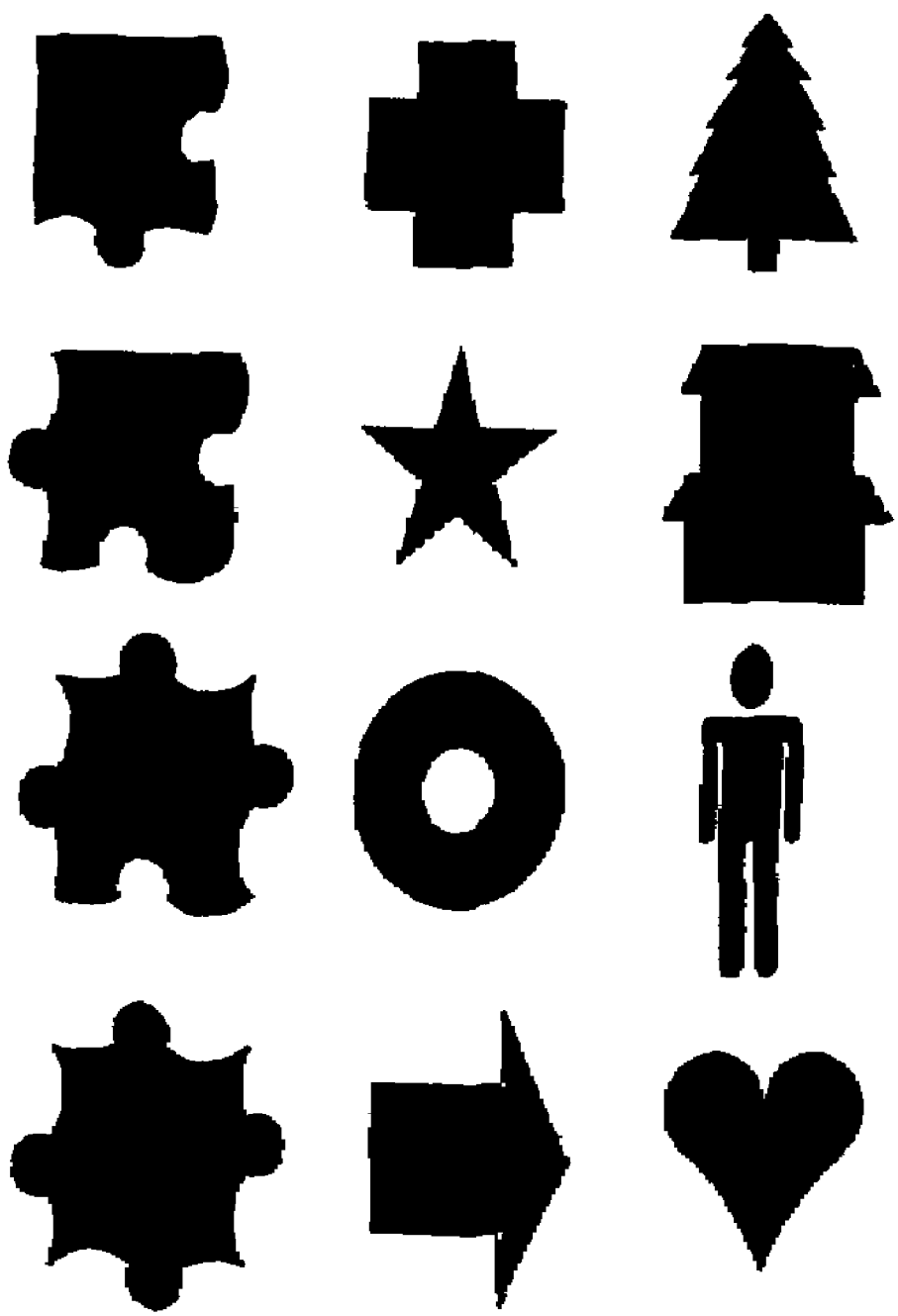
FIG. 9 is a diagram showing an example of division templates.

The concrete procedure of arbitrary region thinning, i.e., arbitrary region division will be described with reference to FIGS. 8 and 9.

First, operational members disposed for arbitrary division will be described. FIG. 8 shows the rear surface of the electronic camera. In FIG. 8, a photograph of Mt. Fuji shot with the camera is displayed on the monitor 32 of the camera. Templates representing the shapes of arbitrary regions used for arbitrary region thinning are displayed in a display region 321 at the right side of the display screen of the monitor 32. In FIG. 8, a quadrangular template, a circular template and a Free Hand button operated when designating an arbitrary polygonal shape are displayed in the template display region 321.

A scroll bar 322 is disposed along the right edge of the template display region 321, and the template is selected by the operation of the scroll bar 322. For example, after the scroll bar 322 is moved to a selection execution region by a command dial not shown, the scroll bar 322 is operated by the up and down selection keys of the arrow keys 323, and the template is selected. As shown in FIG. 8, the selected circular template is superposed and displayed on the monitor 32 and also enclosed with a dotted line in the template display region 321. FIG. 9 shows other selectable templates. Setting of polygonal regions with the Free Hand button will be described later.

The arrow keys 323 are disposed below the monitor 32. By operating these arrow keys 323, the template superposed and displayed on the monitor 32 can be moved up, down, right, and left on the monitor 32.

Below the monitor 32 are disposed the Zoom In button 324, which means magnify the template, and the Zoom Out button 325, which means reduce the template. The size of the template on the monitor 32 can be changed by the Zoom In button 324 and the Zoom Out button 325.

The operation for designating a region in arbitrary region thinning will be described in concrete terms.

(1) Method of Designation Using a Template

A desired template is selected from the template display region 321 by the scroll bar 322, and superimposed on the monitor 32. The template on the monitor 32 is moved to a desired position with the arrow keys 323. The size of the template is magnified or reduced with the Zoom In button 324 or the Zoom Out button 325.

(2) Method of Designating Arbitrary Polygonal Shape with Free Hand Button

When the Free Hand button is selected from the template display region 321 with the scroll bar 322, a pointer is displayed on the monitor 32. The pointer is moved to a desired position with the arrow keys 323, and the position of the pointer is determined when the full-pressed switch 23 is operated. One angle of a polygon is designated by this operation. A frame of a desired polygonal shape is designated by repeatedly conducting the above operation.

When the arbitrary region is designated by the operation of the above-described (1) or (2) and division start is instructed, the image data inside the designated arbitrary region is read from the original image data file (image file A in FIG. 4), the pixels corresponding to the region outside the arbitrary region are complemented by, for example, data for black, and these data are saved as a new image file (image file A1a in FIG. 4). Also, the image data outside the designated arbitrary region is read from the original image data file (image file A in FIG. 4), the pixels of the designated arbitrary region corresponding to a template are complemented by, for example, data for black, and these data are saved as a new image file (image file A2b in FIG. 4).

When arbitrary regions are designated a plurality of number of times and the designated arbitrary regions overlap, divisional image files are created as follows. When an arbitrary region has been designated a first time, the two divisional files are created as described above. For example, they are the image files A1a and A2b of FIG. 4. Here, for convenience, they are called a first divisional image file and a second divisional image file. In this case, an image based on the second divisional image file is displayed on the display monitor 32. That is, the shape of the first arbitrary region is colored black in the displayed image. A second arbitrary region is then designated on the display monitor 32. In a case where part of the secondly designated arbitrary region overlaps the first arbitrary region, the image data of a region in which the two arbitrary regions do not overlap within the second arbitrary region (below, non-overlapping region) is read from the original image data file (image file A of FIG. 4), the pixels corresponding to the region outside the non-overlapping region are complemented by, for example, data for black, and these data are saved as a new image file. This is called a third divisional image file. Moreover, the pixels within the non-overlapping region from the second divisional image file are complemented by, for example, data for black, and these data are saved as a new image file. This is called a fourth divisional image file. An image based on the fourth divisional image file is displayed on the display monitor 32.

Moreover, the first, third and fourth divisional image files of the first to fourth divisional image files are used as image files for tallying.

Fourth Embodiment

In a fourth embodiment, image data is divided into a plurality of image data by UNKNOWN thinning. In each of the pixel thinning division, component thinning division and arbitrary region thinning division described above, a thinning rule at the time of division was set in advance. Thus, information relating to the thinning rule was not included in each image data file after division. In contrast to this, the fourth embodiment is characterized in that information relating to the thinning rule of division is included per divided image data file.

Figure 5:
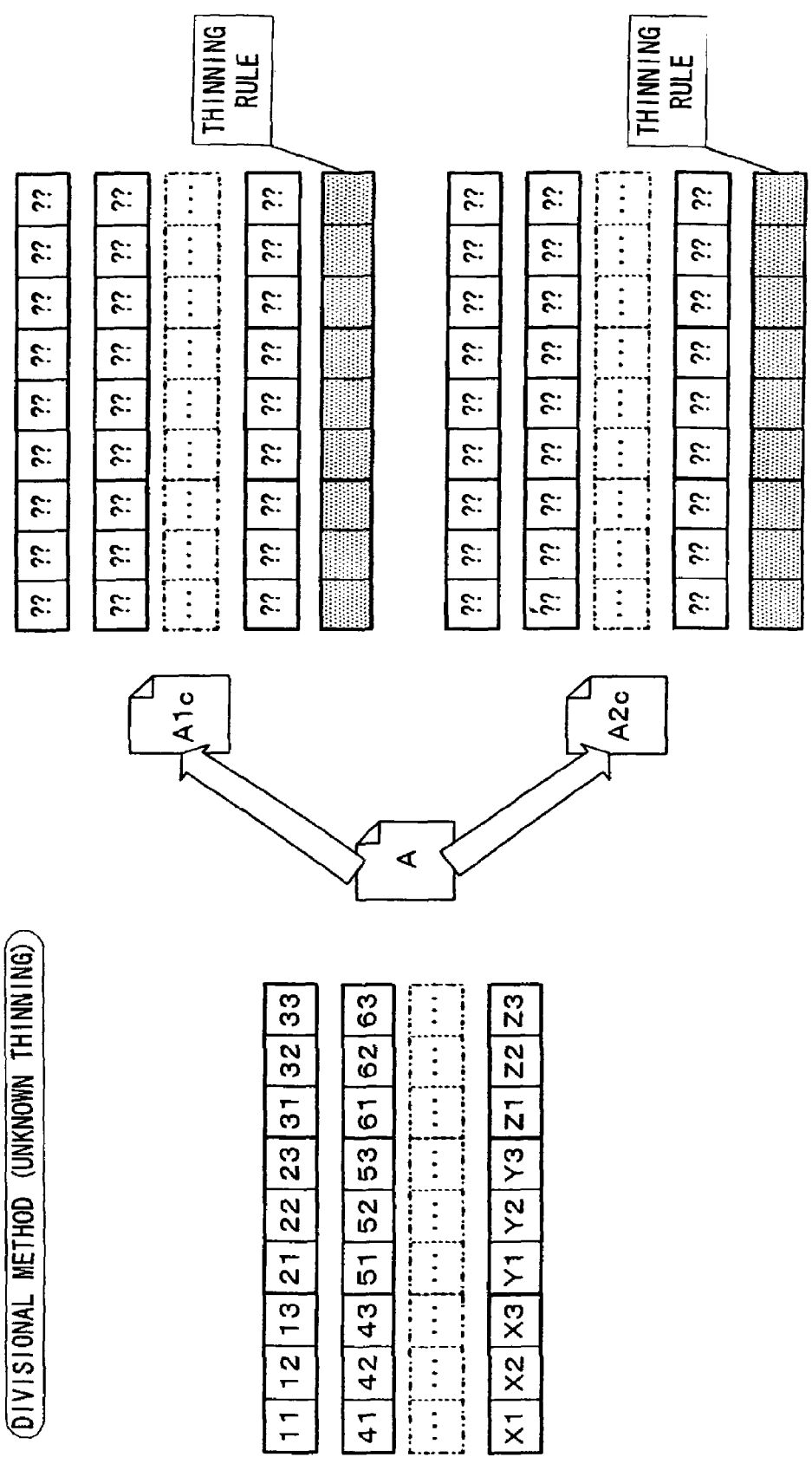
FIG. 5 is an explanatory diagram of UNKNOWN thinning division for dividing an original image data file into two image data files.

FIG. 5 is an explanatory diagram of UNKNOWN thinning division where one original image data file A is divided into two image data files A1c and A2c. In FIG. 5, the data of the original image data file A has the same configuration as that of FIG. 2.

The first image data file A1c after division into the two image data files includes image data and the thinning rule. The thinning rule is the same as that applied to the other image data file A2c after division. The content of image data "??" follows the thinning rule. In this manner, the data applied to the first image data file after division by the thinning rule coincides with the data of the original image data file A.

The second image data file A2c after division into the two image data files includes image data and the thinning rule. The thinning rule is the same as that applied to the other image data file A1c after division. The content of image data "??" follows the thinning rule. In this manner, the data applied to the second image data file after division by the thinning rule coincides with the data of the original image data file A.

In other words, in a n-th image data file Anc (n=1 through N) after division into image data files of N number, only data applied for the n-th image data file after division by the thinning rule coincides with the data of the original image data file A.

According to the above-described fourth embodiment, similar to the first through third embodiments, the portrait right or the copyright of the image resulting from the original image data file A can be split. Moreover, because the thinning rule is included in the image data files after division, the thinning rule can be changed when dividing the image data with the electronic still camera. That is, in the first through third embodiments, because the thinning rule is set in advance, the original image data file A before division can be restored by reproducing all of the image data files after division and replacing the complementary data portions of each with the data that the other image data files include. However, when the thinning rule is changed by the electronic still camera, the original image data cannot be restored unless the thinning rule is known. Thus, in the fourth embodiment, by including the thinning rule in the image data files after division, it becomes possible to restore the original image data file before division even if the thinning rule is changed.

Figure 6:
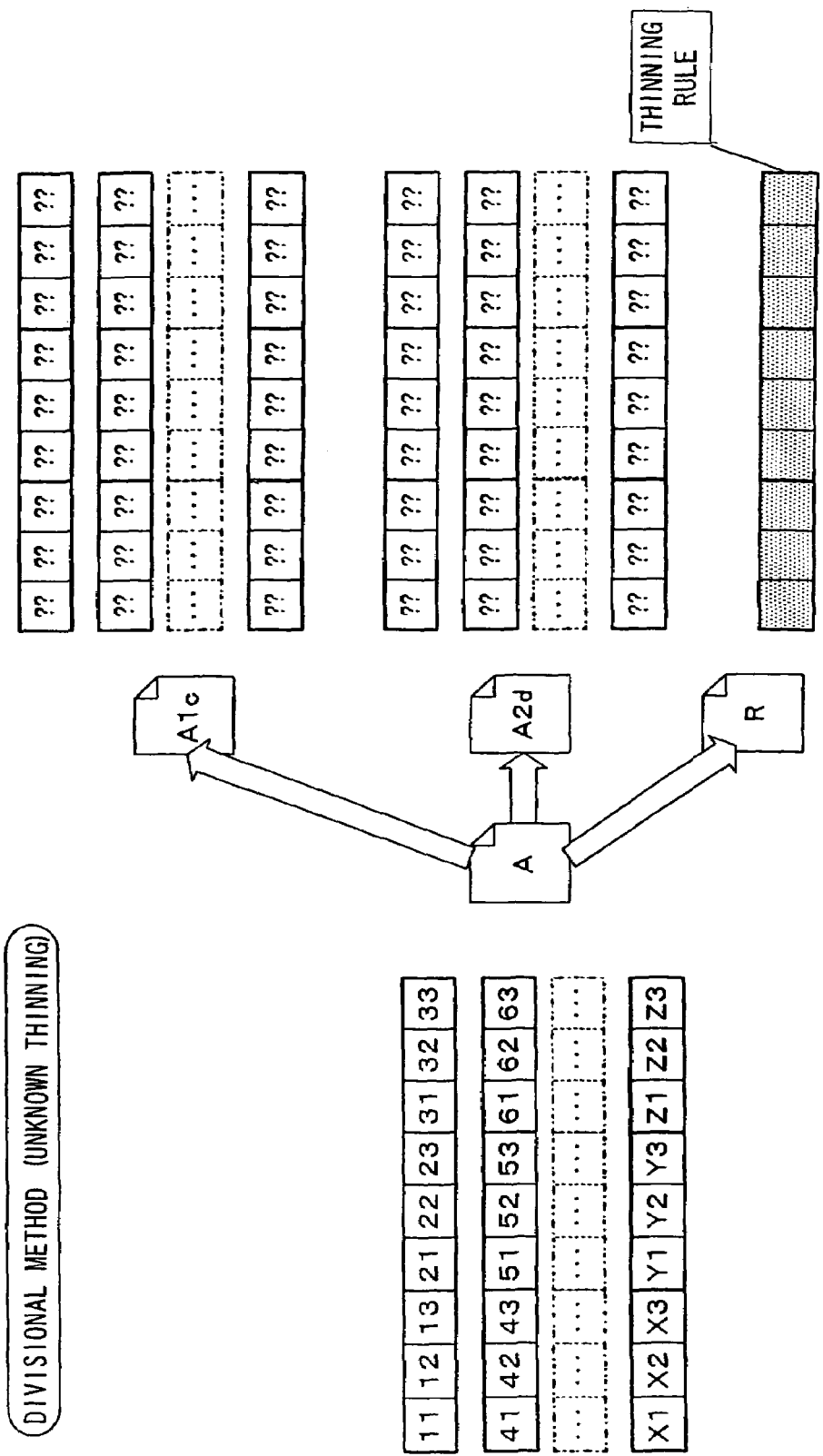
FIG. 6 is an explanatory diagram of unknown thinning division for dividing an original image data file into two image data files and generating a data file storing a thinning rule at the time of division.

Instead of recording the thinning rule in all of the divided image data files, a data file in which only the thinning rule is recorded may also be generated. FIG. 6 is an explanatory diagram of UNKNOWN thinning division where one original image data file A is divided into two image data files A1d and A2d and a data file R in which the thinning rule at the time of division is stored is generated. In FIG. 6, the data of the original image data file A has the same configuration as that of FIG. 2.

The content of image data "??" of the first image data file A1d after division into the two image data files follows the thinning rule stored in the data file R. That is, the data applied to the first image data file after division by the thinning rule coincides with the data of the original image data file A. The content of image data "??" of the second image data file A2d after division into the two image data files follows the thinning rule stored in the data file R. That is, the data applied to the second image data file after division by the thinning rule coincides with the data of the original image data file A.

Fifth Embodiment

In the above-described first through fourth embodiments, description was given in regard to division of image data portions. Usually, data generated by the electronic still camera includes an image data portion and an additional information portion. The image data portion is the minimum data necessary to reproduce an image, which is required to meet standards, such as JPEG format. The additional information portion is data such as a description (caption) of the image, photographing information (shutter speed, exposure time, etc.), and an voice caption. In the fifth embodiment, the image data portion of the original image data file A is divided into image data files of N number and registered, and an image data file including the additional information portion and an image data portion composed of complementary data is registered as an N+1th file.

In regard to the division into image data files of N number, one of any of the division methods according to the aforementioned first through fourth embodiments is used. In the N+1th file, data generating, for example, black is used as complementary data for the image data portion thereof. Also, the additional information portion that the original image data file A has is used for the additional information portion of the N+1th file.

According to the above-described fifth embodiment, similar to the first through fourth embodiments, the portrait right and the copyright of the image resulting from the original image data file A can be split. Moreover, the data of the additional information portion that the original image data file A has can be registered in the N+1th file after division.

In the fifth embodiment, description was given of an example where only the image data portion of the original image data file A is divided into the first to Nth image data files and registered and the additional information portion is registered without being divided into the N+1th file. In place thereof, the invention may be configured so that the additional information portion is registered without being divided in each of the first to Nth image data files after division.

Also, the invention may be configured so that the image data portion is not divided and only the additional information portion is divided. In this case, the additional information portion is divided separately into headings such as captions and photographing information. Then, the caption and the image data portion of the original image data file A are combined and registered as an image data file A1e after division, and the photographing information and the image data portion of the original image data file A are combined and registered as an image data file A2e. Thus, the right to obtain the additional information portion resulting from the original image data file A can be split.

Moreover, both the image data portion and the additional information portion of the original image data file A may be divided, and the divided image data portions and the divided additional information portions may be respectively combined and registered as image data files A1f and A2f.

In the above description, a case was described where the thinning rule was set so that the image data portion of the original image data file A before division was equally divided per 1/N and applied to each image data file of N number after division. In place thereof, the division ratio may be changed by adding weight to the thinning rule. In this case, the portrait right and the copyright of the image resulting from the original image data file A can be unequally segmented.

In the above description, the plurality of image data files after division respectively included part of the original image data file A, and data that was lacking after division in comparison to the original image was complemented. An image data file after division may be generated by filling the portions of lacking data, instead of using the complementary data. FIG. 7 is an explanatory diagram of pixel thinning division that does not use complementary data. The original image data file A before division is the same as that of FIG. 2. In a first image data file A1' after division in FIG. 7, the first pixel is composed of data 11, data 12 and data 13. The second pixel is composed of data 41, data 42 and data 43. In this manner, the data of the (1+Nx)th pixel of the original image data file A is substituted as the data of the (1+x)th pixel of the first image data file. Here, N is the divisional number, and x is 0, 1, 2, etc.

In a second image data file A2' after division in FIG. 7, the first pixel is composed of data 21, data 22 and data 23. The second pixel is composed of data 51, data 52 and data 53. In this manner, the data of the (2+Nx)th pixel of the original image data file A is substituted as the data of the (1+x)th pixel of the second image data file. Here, N is the divisional number, and x is 0, 1, 2, etc.

In a third image data file A3' after division in FIG. 7, the first pixel is composed of data 31, data 32 and data 33. The second pixel is composed of data 61, data 62 and data 63. In this manner, the data of the (3+Nx)th pixel of the original image data file A is substituted as the data of the (1+x)th pixel of the third image data file. Here, N is the divisional number, and x is 0, 1, 2, etc.

As described above, when data intervals are filled and image data files after division are generated without complementing lacking data after division, an increase in data size that arises due to the number of files increasing as a result of division can be suppressed and the amount of memory used can be conserved.

It should be noted that the invention may also be configured so that the division methods according to the first through fifth embodiments are selected with the camera.

INDUSTRIAL APPLICABILITY

While description was given above using an electronic still camera as an example, the invention can also be applied to video cameras, recording devices, and document creating devices such as word processors. That is, the invention is not limited to still image data files and can also be applied to moving image data files, files in a three-dimensional image format, files in an audio format, and files in a text format.

The invention can also be applied to a case where a data file is downloaded to and divided in a personal computer or the like. In this case, a program for executing the various divisional formats is stored in advance in the personal computer, the original image file is read from a memory card or the like, and image division such as described above is conducted. Thus, the computer functions as a data file generating apparatus.

The invention claimed is:

1. An electronic camera, comprising:
an image-capturing device that captures a subject image and outputs image data obtained;
a dividing device that divides the image data outputted from the image-capturing device into a plurality of sets of divisional image data; and
a file generating device that generates a plurality of image data files that are individually reproducible, with each of the plurality of image data files containing a set of the divisional image data obtained by the dividing device,
wherein the divisional image data includes:
a portion of image data that results from the dividing of the outputted image data, and
complementary data,
wherein the portion of the image data that results from the dividing of the outputted image data is arranged in the divisional image data at a region that is the same region in which the portion of the image data is arranged in the outputted image data, and
wherein each set of divisional image data is individually reproducible and has a number of pixels that is the same number of pixels as the number of pixels of the outputted image data.

2. An electronic camera, according to claim 1, wherein:
each of the plurality of image data files includes an image data region in which the divisional image data are recorded and a complementary data region in which complementary data other than the divisional image data is recorded, and
the image data region is set at a region equivalent to a recording region in which the divisional image data to be recorded in the image data region are recorded in the image data before division.

3. An electronic camera according to claim 1, wherein:
each of the plurality of image data files includes an image data region in which the divisional image data are recorded and a complementary data region in which complementary data other than the divisional image data is recorded, and
within each image date file, a plurality of divisional image data are continuously recorded.

4. An electronic camera according to claim 1, further comprising:
an image processing device that conducts predetermined data processing on the image data outputted from the image-capturing device, wherein
the file generating device generates the plurality of sets of image data files after the image processing device conducts the data processing at the time of photographing of the camera.

5. An electronic camera according to claim 1, further comprising:
an outputting device that outputs the image data outputted from the image-capturing device to an external device, wherein
the file generating device generates the plurality of sets of image data files before the image data is outputted from the outputting device.

6. An electronic camera according to claim 5, wherein:
in response to a request to output the image data from the outputting device to the external device, the dividing device divides the image data and the file generating device generates the plurality of sets of image data files.

7. An electronic camera, comprising:
a monitor that displays an original image before division;
a selection operation member that selects a template among a plurality of predetermined templates of arbitrary shapes;
a display control device that superimposes a selected template on the original image displayed on the monitor; and
a file generating device that generates, from the image data, a first divisional image file by reading image data within a region corresponding to the template and complementing image data of a remaining region by image data that is different from the original image, and for generating, from the original image data, a second divisional image file by reading image data of a region other than the region corresponding to the template and complementing image data of a remaining region by image data that is different from the original image data;
wherein the first and second divisional image files include:
a portion of image data that results from the dividing of the original image, and
complementary data,
wherein the portion of the image data that results from the dividing of the image is arranged in the divisional image files at a region that is the same region in which the portion of the image data is arranged in the original image, and
wherein the first and second divisional image files are individually reproducible and have a number of pixels that is the same as the number of pixels of the original image.

8. A data file generating apparatus, comprising:
a dividing device that divides original data into a plurality of sets of divisional data; and
a file generating device that generates a plurality of data files that are individually reproducible, with each of the plurality of data files containing a set of divisional data obtained by the dividing device,
wherein the divisional data includes:
a portion of image data that results from the dividing of the original data, and
complementary data,
wherein the portion of the image data that results from the dividing of the original data is arranged in the divisional data at a region that is the same region in which the portion of the image data is arranged in the original data, and
wherein each set of divisional image data is individually reproducible and has a number of pixels that is the same as the number of pixels of the original data.

9. An electronic camera, comprising:
an image-capturing device that captures a subject image and outputs image data obtained;
a dividing device that divides the image data outputted from the image-capturing device into a plurality of sets of image data on a pixel-by-pixel basis; and
a file generating device that generates a plurality of image data files that are individually reproducible, with each of the plurality of image data files containing a set of image data divided by the dividing device,
wherein the image data includes:
a portion of image data that results from the dividing of the outputted image data, and
complementary data,
wherein the portion of the image data that results from the dividing of the outputted image data is arranged in the image data at a region that is the same region in which the portion of the image data is arranged in the outputted image data, and
wherein each set of image data is individually reproducible and has a number of pixels that is the same as the number of pixels of the outputted image data.

10. An electronic camera according to claim 9, wherein:
the plurality of sets of image data are composed of image data for red, image data for green, and image data for blue, respectively.

11. An electronic camera, comprising:
an image-capturing device that captures a subject image and outputs image data obtained;
a dividing device that divides the image data outputted from the image-capturing device into data for red, data for green, and data for blue; and
a file generating device that generates separately reproducible an image data file for red, an image data file for green, and an image data file for blue that respectively contains image data for red, image data for green, and image data for blue divided by the dividing device,
wherein each image data file includes:
a portion of image data that results from the dividing of the outputted image data, and
complementary data,
wherein the portion of the image data that results from the dividing of the outputted image data is arranged in each image data file at a region that is the same region in which the portion of the image data is arranged in the outputted image data, and
wherein each image data file is individually reproducible and has a number of pixels that is the same as the number of pixels of the outputted image data.

12. electronic camera, comprising:
an image-capturing device that captures a subject image and outputs image data obtained;
a dividing device that divides the image data outputted from the image-capturing device into a plurality of predetermined blocks; and
a file generating device that generates a plurality of image data files that are individually reproducible, with each of the plurality of image data files containing a set of image data of a block divided by the dividing device,
wherein the predetermined blocks include:
a portion of image data that results from the dividing of the outputted image data, and
complementary data,
wherein the portion of the image data that results from the dividing of the outputted image data is arranged in the predetermined block at a region that is the same region in which the portion of the image data is arranged in the outputted image data, and
wherein the predetermined blocks are individually reproducible and have a number of pixels that is the same as the number of pixels of the outputted image data.

13. An electronic camera, comprising:
an image-capturing device that captures a subject image and outputs image data obtained;
a dividing device that divides the image data outputted from the image-capturing device; and
a file generating device that generates respectively reproducible a plurality of image data files in which the image data divided by the dividing device are stored by a predetermined algorithm and in which the algorithm is also recorded,
wherein each image data file includes:
a portion of image data that results from the dividing of the outputted image data, and
complementary data,
wherein the portion of the image data that results from the dividing of the outputted image data is arranged in each image data file at a region that is the same region in which the portion of the image data is arranged in the outputted image data, and
wherein each image data file is individually reproducible and has a number of pixels that is the same as the number of pixels of the outputted image data.

14. An electronic camera, comprising:
an image-capturing device that captures a subject image and outputs image data obtained;
a dividing device that divides the image data outputted from the image-capturing device; and a file generating device that generates respectively reproducible a plurality of image data files in which the image data divided by the dividing device are stored by a predetermined algorithm, and that generates one algorithm file in which the algorithm is recorded, wherein each image data file includes:
- a portion of image data that results from the dividing of the outputted image data, and
- complementary data, wherein the portion of the image data that results from the dividing of the outputted image data is arranged in each image data file at a region that is the same region in which the portion of the image data is arranged in the outputted image data, and wherein each image data file is individually reproducible and has a number of pixels that is the same as the number of pixels of the outputted image data.

15. An electronic camera according to claim 11, wherein:
the image data includes an image information portion and an additional information portion; and
the image data files respectively include image information portions and additional information portions having been divided.

16. An electronic camera according to claim 11, wherein:
the image data includes an image information portion and an additional information portion;
the dividing device divides only image data of the image information portion; and
the file generating device generates a plurality of image information files including the image information portions divided and an additional information file including the additional information portion undivided.

17. An electronic camera according to claim 11, further comprising:
an image processing device that conducts predetermined data processing on the image data outputted from the image-capturing device, wherein
the file generating device generates the plurality of image data files after the image processing device conducts the data processing at the time of photographing of the camera.

18. An electronic camera according to claim 11, further comprising:
an outputting device that outputs the image data outputted from the image-capturing device to an external device, wherein
the file generating device generates the plurality of image data files before the image data is outputted from the outputting device.

19. An electronic camera according to claim 5, wherein:
the image data that the dividing device divides is image data serving as one image when it is restored.

20. An data file generating apparatus according to claim 8, wherein:
the image data that the dividing device divides is image data serving as one image when it is restored.

21. An electronic camera according to claim 13, wherein:
the image data includes an image information portion and an additional information portion; and
the image data files respectively include image information portions and additional information portions having been divided.

22. An electronic camera according to claim 13, wherein:
the image data includes an image information portion and an additional information portion;
the dividing device divides only image data of the image information portion; and
the file generating device generates a plurality of image information files including the image information portions divided and an additional information file including the additional information portion undivided.

23. An electronic camera according to claim 13, further comprising:
an image processing device that conducts predetermined data processing on the image data outputted from the image-capturing device, wherein
the file generating device generates the plurality of image data files after the image processing device conducts the data processing at the time of photographing of the camera.

24. An electronic camera according to claim 13, further comprising:
an outputting device that outputs the image data outputted from the image-capturing device to an external device, wherein
the file generating device generates the plurality of image data files before the image data is outputted from the outputting device.

25. An electronic camera according to claim 11, wherein:
the image data that the dividing device divides is image data serving as one image when it is restored.

26. An electronic camera according to claim 13, wherein;
the image data that the dividing device divides is image data serving as one image when it is restored.

* * * * *